Feb. 8, 1938.                H. A. L. JONES                2,108,014
                              TACHOMETER
                           Filed Jan. 15, 1937
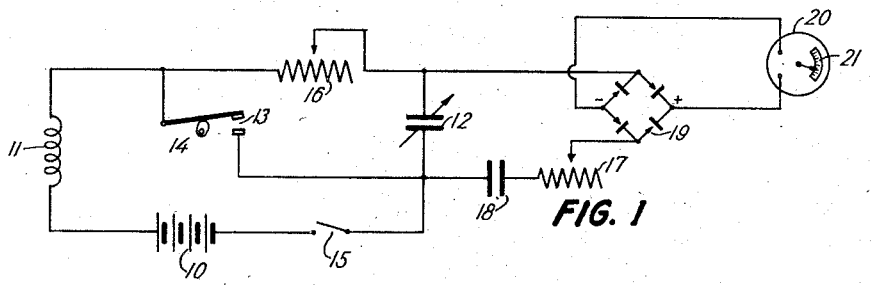
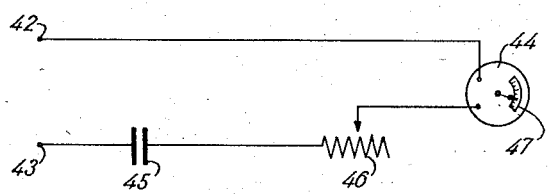
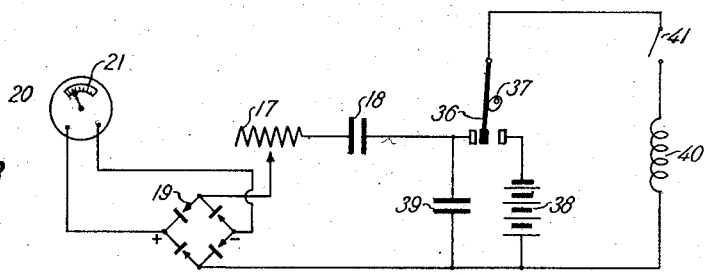
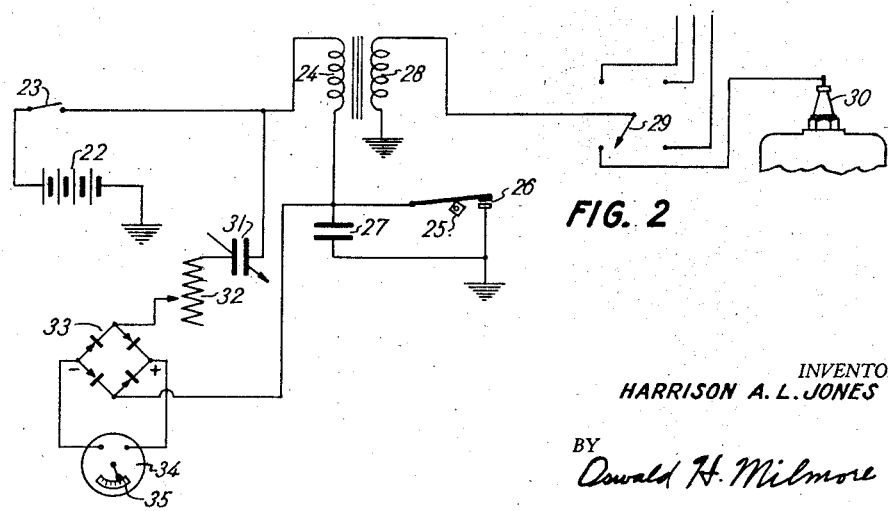
INVENTOR.
HARRISON A. L. JONES
BY Oswald H. Milmore
HIS ATTORNEY.

Patented Feb. 8, 1938

2,108,014

UNITED STATES PATENT OFFICE 2,108,014

TACHOMETER

Harrison A. L. Jones, Oakland, Calif., assignor of one-fifth to Arthur M. Girard and one-fifth to Adelaide B. Girard, both of Oakland, Calif.

Application January 15, 1937, Serial No. 120,738

23 Claims. (Cl. 175—183)

This invention relates to an electrically actuated tachometer which may be employed for indicating the angular or linear speed of a body. It is particularly adapted for use in connection with internal combustion engines which are equipped with an electrical ignition system comprising a circuit breaker or interrupter which opens and closes a circuit at a frequency which is proportional to the speed of the engine, such as, for example, the form of ignition system in which a primary and a secondary circuit are inductively coupled, the primary circuit being provided with a source of electrical power and with the said circuit breaker, whereby current impulses, at a frequency proportional to the speed of the engine, are caused to flow through the primary circuit and impressed upon the secondary circuit; or the form of ignition system known as the make and break spark coil ignition system; but my tachometer may be applied to other devices, such as those which are not normally associated with an electrical circuit, as pointed out in detail below. This application is a continuation-in-part of my application Serial No. 759,206, filed December 26, 1934.

It is a primary object of my invention to improve and simplify the construction and operation of tachometers of the character described, and to utilize existing facilities provided by the usual ignition systems of internal combustion engines. It is a further object to provide an electrical tachometer which may be simply connected to an existing electrical circuit which is provided with inductive or condensive or inductive and condensive reactances and with means for periodically applying an electromotive force to the circuit in response to the speed of the body the velocity of which is to be measured. Other objects are to provide an electrical tachometer which may be connected in shunt with either a condensive or inductive reactance of such a circuit or in shunt with a resistance of such a circuit, as, for example, a primary circuit of an ignition system, to indicate the frequency of the electrical impulses which are applied to said circuit by the said means for applying an electromotive force; to provide an electrically actuated tachometer which will consume so small an amount of electrical energy or current as not to impair the normal operation of the existing circuit; to provide a tachometer which may be readily and simply adjusted to adapt it for use with different types of ignition systems, as well as with different systems of the same type having different electrical characteristics; and to provide a tachometer of the type described which may be quickly and readily attached to an ignition or similar circuit without disturbing any part of said circuit, and which may be temporarily or permanently connected, as conditions may demand.

My improved tachometer is particularly useful in determining the speed of internal combustion engines when making adjustments, such as those involving the setting of the spark advance, the valve clearances, and the carburation. For instance, one adjustment may cause an increase or decrease in the speed of the rotation of the crankshaft, but this change may be too small to be detected by the ear; the tachometer will, however, detect these small variations in speed and an improved and more efficient adjustment can be made with it. When used in this manner it is often not essential that the tachometer indicate accurately the true speed of the motor, it being sufficient that it indicate variations in such speed.

When dual or double-throated carburetors, or double or dual ignition systems are employed (as for example, in V-type motors), it often becomes necessary to compare the operation of one portion of the engine with the other, so that all will, with the same fuel supply, operate at exactly the same speed. Again, whenever two or more motors are used to drive the same vehicle, as on an airplane, it is essential that they rotate at substantially the same speed, or at a desired and predetermined difference in speeds. The same desideratum obtains in motor boats which employ several motors to drive individual propulsion means. In installations of these characters the tachometer will obviously be very useful since the motors can be readily adjusted to rotate at the same number of revolutions per minute, or at a desired difference in revolutions, and this will be indicated by placing the tachometers, one for each motor, at a convenient point where they can be observed by the pilot or operator.

The tachometers can also be employed for indicating troubles in the ignition circuit, such as short circuits in the coils of the transformer, leaks in the condensers, and other similar conditions, since defects of this nature will cause a variation in the flow of current through the metering circuit of my tachometer and will produce readings which are so greatly incorrect that the operator will be at once apprised of the existence of the defect and will, accordingly, make a check on the ignition circuit.

The tachometer of the present invention may, however, also be employed for measuring speeds in installations other than internal combustion engines, which installations may or may not normally be provided with an electrical circuit, as pointed out below.

The tachometer of my invention comprises a primary circuit and a metering circuit, the primary circuit being provided with an inductive or condensive, or with both inductive and condensive reactances, with a source of electrical potential, and with means, controlled by the motion of the body the speed of which is to be measured, for periodically interrupting the primary circuit. If convenient, a resistance may be included in the primary circuit. In the preferred application of the tachometer, the said primary circuit is an element of a pre-existing ignition circuit of an internal combustion engine. The metering circuit is provided with means for measuring alternating or oscillating electromotive potential in the primary circuit set up by said reactances.

The invention may be further understood from the following detailed description, taken in connection with the accompanying drawing which is, however, exemplary only, it being understood that numerous modifications may be made in the arrangement of elements shown without departing from the spirit and scope of the invention as defined in the claims.

In the drawing, Figure 1 illustrates, diagramatically, one embodiment of my invention; Figure 2 illustrates the application of the tachometer of Figure 1 to an internal combustion engine; Figure 3 illustrates a modification of the tachometer circuit of Figure 1; and Figure 4 is a fragmental view illustrating a modification of the metering circuit.

Referring to Figure 1, 10 represents a source of electrical potential, such as a storage battery or a constant voltage, direct current generator; 11 is an inductive reactance; 12 is a fixed or variable condensive reactance; 13 is an interruptor, mechanically connected so as to be actuated by the cam 14. The cam 14 may be connected in any suitable manner to the body the speed of which is to be measured, so as to operate the interruptor 13 at a frequency which is proportional to the speed of the body. The mechanical connection may, for example, be such as to cause the frequency of the interruptions to vary between 10 and 200 interruptions per second. If convenient, the interruptor 13 may be actuated directly by a reciprocating element other than the cam 14. The circuit may be completed by means of a switch 15. An adjustable resistance 16, which may be set to zero resistance, may, if desired, be connected in the circuit.

In the primary circuit thus far described, when the circuit is closed by the switch 15 and the interruptor 13, direct current flows through the inductive reactance 11, building up a magnetic field; when the interruptor 13 is opened a moderately high potential damped oscillating current is set up in the primary circuit, flowing between the two reactances, and alternately charging and discharging the same, at a frequency depending upon the natural period of the circuit. The natural period may be reduced or increased by means of the variable condenser 12, so that the period of the oscillating current is small in comparison to the period corresponding to the frequency at which the interruptor 13 is actuated. The maximum potential of the oscillating current depends upon the characteristics of the circuit. In the case of a four cylinder automotive engine employing a six volt storage battery and inductively coupled primary and secondary circuits, it may, for example, be from 200 to 400 volts.

The metering circuit of my tachometer is arranged to measure an average potential created in the primary circuit as a result of the oscillating current, which may be a true average, or a root mean square, depending upon the type of instrument employed. The oscillating current flows only through a fraction of the total time transpiring between successive openings of the primary circuit, and the potential which is measured in my metering circuit is based on the total time, and not upon the time during which the oscillating current actually flows. Hence the potential measured will be but a small fraction of the maximum potential. The metering circuit may be connected in shunt to any portion of the primary circuit which is affected by the oscillating current, such as in shunt with the resistance 16 when the latter is set to an appreciable value; but it is preferably connected in shunt with one of the reactances, as shown in the drawing. As shown in Figure 1, it is connected in shunt with the condenser 12, the metering circuit then including, in series, the condenser 12, a resistance 17, a condenser 18, and a rectifier 19, such as, for example, a bridge rectifier of the copper oxide type. A direct current galvanometer 20 having a scale 21 is connected to the output terminals of the rectifier 19. The rectifier impresses direct current impulses upon the galvanometer, which may be of any desired type, preferably a meter of the movable coil, permanent magnet type, known as the D'Arsonval movement, since such a device consumes little energy, is rapidly responsive to variations in current, and is not greatly affected by variations in temperatures. The scale 21 may be marked in terms of angular or linear speed, such as, for example, revolutions per minute or feet per second.

It will be noted that the condenser 18 prevents direct current flowing in the primary circuit from causing an appreciable flow of current in the metering circuit. As a consequence of this condenser, when the direct current is flowing in the primary current to charge the inductance 11, this will not be registered by the galvanometer 20, and a zero reading will be obtained when the interruptor 13 remains closed, as when the body has a zero speed. When the opening of the interruptor 13 causes the reactances to set up the oscillating current in the primary circuit a number of electrical direct current impulses will be transmitted to the galvanometer 20, due to the bridge 19, the number depending upon the rate at which the oscillating current is damped, and the quantity of current flowing depending upon the potential of the oscillating current, as well as upon the impedance characteristics of the circuits, taking into consideration particularly the condenser 18 and the resistance 17. In view of the latter, only a small quantity of current is consumed in the metering circuit, such as, for example, from 0.1 to 10 milliamperes, and the metering circuit acts to measure an average voltage. While it is possible to eliminate the resistance 17, and to employ it in series with the galvanometer 20, as by substituting a direct current voltmeter, such an arrangement is not so desirable because of increased energy losses in the rectifier.

Assuming that the reactances of the primary circuit are charged to the same extent each time the interruptor closes the primary circuit, substantially the same quantity of current will flow through the galvanometer 20 each time the interruptor 13 is opened. Since in the present invention the interruptor will be operated at a frequency which is high enough to cause the pointer of the galvanometer to assume a steady position, but not so high as to approach the period which corresponds to the time during which the damped oscillations flow in the primary circuit, a greater current will flow through the metering circuit when the number of interruptions per unit time is increased. Hence, when the interruptor is operated between these frequency limits, the current flowing through the galvanometer increases as the frequency of the interruptions increases, and as changes in the speed of the cam 14 will depend upon the speed of the body, the reading on the scale 21 will increase as the speed of the body increases. At higher frequencies the quantity of direct current flowing from the source of potential 10 between interruptions will drop off, due to the inductive impedance of the reactance 11, so that the latter will not be charged to the same extent as at lower frequencies, resulting in an oscillating current which has a slightly lower potential, and the intensity of the current impressed upon the metering current will not, therefore, be exactly the same upon each interruption of the interruptor 13. For this reason the current registered on the scale 21 may, in certain cases, not increase in direct proportion to the frequency of the interruptor; this effect of the inductive reactance in retarding the flow of direct current in the primary circuit and thereby lowering the potential generated by the reactances is, however, less than the effect of the number of impulses per unit time in increasing the flow of current in the metering circuit, and the galvanometer 20 will indicate progressively increased readings as the frequency of the interruptor increases throughout the operative range of frequencies, as stated above. It is, moreover, possible to select an inductance 11 of such characteristics that it may permit the ultimate current in the primary to be attained prior to each interruption even at the highest frequency, although this is not essential and is, moreover, not possible when the tachometer is connected to a pre-existing ignition circuit.

Since the period during which the interruptor is open must exceed the time during which the oscillating current is flowing in the primary circuit, unless it is permissible to have the instrument have a lower deflection for a given change in speed at higher speeds, the maximum frequency of the interruptor 13 is limited by the rate at which the oscillations are damped; and it may be desirable to design the circuit so as to damp the oscillations rapidly, as by providing the resistance 16 and/or by making the condenser 12 of a variable capacity. This will permit the interruptor 13 to be operated at higher frequencies.

Figure 2 illustrates the application of my tachometer to a conventional ignition system of an internal combustion engine. In this figure, 22 indicates the battery, 23 the ignition switch, 24 the primary coil of the transformer, 25 the breaker cam, 26 the breaker contacts, and 27 the condenser cooperating therewith, the circuit being completed through ground. The secondary circuit includes the secondary coil 28 of the transformer, a distributor 29, and spark plugs 30, one for each outlet from the distributor.

The primary circuit of the above described ignition system corresponds to the primary circuit illustrated in Figure 1, and functions in a similar manner. The metering circuit, which may be connected in shunt with any portion of the primary circuit affected by the oscillating current set up by the coil 24 and condenser 27 when the breaker points 26 are separated, or across the secondary coil 28, but preferably across the coil 24, in the manner illustrated in this figure or, across the condenser 27, in the manner illustrated in Figure 1, may be similar to that described above. As shown, it comprises, in series, the primary coil 24, a fixed or variable condenser 31, an adjustable resistance 32, and a rectifier 33, the outlet terminals of the latter being connected to a direct current galvanometer 34 provided with a scale 35.

The operation of this tachometer is similar to that described in Figure 1. In an ignition circuit of this character, the frequency with which the breaker contacts 31 are actuated depends upon the engine speed and the number of cylinders. Hence, there is a direct ratio between the number of high frequency impulses or trains of oscillations created in the primary circuit and the engine speed, substantially the same number of oscillations being produced each time the breaker contacts are separated. Each train of oscillations will, due to the action of the bridge rectifier, impress a train of direct current impulses upon the galvanometer 34, and the reading on the scale 35 will increase as the speed of the engine is increased. Since, however, the initial potential created by the coil 24 upon the separation of the breaker contacts becomes less as the speed of the engine is increased, due to the inductive impedance, this increase in the reading on the scale 35 will in many cases not be proportional to the increase in the speed of the engine, but will increase according to a complex law according to the design of the ignition system on which it is used.

When the tachometer is applied to the engine, it is only necessary to attach the terminals of the metering circuit to the terminals of the condenser or of the primary coil, this being very quickly effected. The operation of the ignition circuit will not be appreciably affected. When the tachometer is successively applied to different ignition systems, the resistance 32 may be adjusted according to calibration to give the correct readings. Moreover, since the frequency of the oscillating current also varies with ignition systems of different makes, it is often desirable to make the condenser 31 of variable capacity. During any one temporary or permanent installation, or when the tachometer is to be employed for only one make of ignition system, the condenser 31 and the resistance 32 have constant values.

While it is customary to connect a condenser in shunt with the interruptor to prevent sparking, it is also possible to connect these elements of the circuit in series with one another as, for example, in the ignition circuit shown in the U. S. Patent No. 2,059,243. My metering circuit can, in this instance, also be connected either in shunt with the inductance or the condenser, such as the primary coil of the transformer 27 or the condenser 18 of the said patent.

According to a modification of the tachometer illustrated in Figure 3, a two-way contact switch 36 is operated by a cam 37 at a frequency which is proportional to the speed of the body whose speed is to be measured. One fixed contact of the switch is connected to one terminal of the battery 38, and the other fixed contact to the condenser 39. The other terminals of the condenser and the battery are both connected to one terminal of an inductance 40, the other terminal of which is connected to the movable contact of the switch 36 through the controlling switch 41. The metering circuit, which is similar to that of Figure 1, is connected in shunt with the condenser 39, as shown, or in shunt with the inductance 40 or a portion thereof. The operation of the metering circuit is similar to that described above in connection with Figure 1, like elements being designated by like reference characters.

In Figures 1, 2 and 3 a rectifying bridge and a direct current galvanometer were employed. Such a type of instrument is generally preferred for a tachometer of the type herein described, because it is less delicate and expensive, and requires less current to operate than an alternating current meter; an alternating current meter may, however, also be employed, particularly where the energy requirements are not too great. A modification of the metering circuit which may be employed for an alternating current meter, such as a hot wire ammeter, a thermocouple ammeter, or a moving vane ammeter, is illustrated in Figure 4, in which the leads 42 and 43 may be connected to the primary circuits of Figures 1, 2 or 3, either in shunt with the inductive or condensive reactances, or a resistance. The alternating current meter 44 is connected in series with the condenser 45 and resistance 46, as shown, the rectifying unit being not necessary in this instance. The reading on the scale 47 of the meter 44 will indicate the speed of the body, which is proportional to the frequency of the interruptions in the primary circuit.

While certain features of the present invention are more or less specifically described, I wish it understood that various changes may be made within the scope of the appended claims; and, similarly, that the materials and finish of the several parts employed may be suitably selected by those skilled in the art, depending upon the varying conditions of use.

I wish it also understood that I am not to be bound to any theoretical explanation relative to the operation of the tachometer which is contained herein.

I claim as my invention:

1. Apparatus for measuring the speed of a body, comprising a primary electrical circuit including a reactance, means controlled by the body for periodically charging said reactance at a frequency which varies with the speed of the body, and a metering circuit connected in shunt with an impedance whose potential is determined by the flow of current through said primary circuit including means for measuring oscillating potential drop across said impedance.

2. The apparatus according to claim 1 in which the impedance is the said reactance.

3. Apparatus for measuring the speed of a body, comprising a primary electrical circuit including a reactance, means controlled by the body for periodically impressing a direct current upon said reactance at a frequency which varies with the speed of the body, and a metering circuit connected in shunt with an impedance in said primary circuit including means for measuring oscillating potential drop across said impedance.

4. Apparatus for measuring the speed of a body, comprising a primary electrical circuit including a reactance, means controlled by the body for periodically impressing a direct current upon said reactance at a frequency which varies with the speed of the body, and a metering circuit connected in shunt with an impedance whose potential is determined by the flow of current through said primary circuit including, in series, a condenser and means for measuring potential.

5. Apparatus for measuring the speed of a body, comprising a primary electrical circuit including an inductive reactance and a condensive reactance, means controlled by the body for periodically impressing a direct current upon one of said reactances at a frequency which varies with the speed of the body, and a metering circuit connected in shunt with an impedance in said primary circuit including, in series, a condenser and means for measuring the magnitude of oscillating current impressed upon said metering circuit.

6. The apparatus according to claim 5 in which the metering circuit is connected in shunt with said condensive reactance.

7. The apparatus according to claim 5 in which the metering circuit is connected in shunt with said inductive reactance.

8. Apparatus for measuring the speed of a body, comprising a primary electrical circuit including an inductive reactance and a condensive reactance, means controlled by the body for periodically impressing a direct current upon the inductive reactance at a frequency which varies with the speed of the body, and a metering circuit connected in shunt with an impedance in said primary circuit including, in series, a condenser and means for measuring an average magnitude of oscillating current impulses impressed upon said metering circuit.

9. The apparatus according to claim 8 in which the metering circuit is connected in shunt with one of said reactances.

10. Apparatus for measuring the speed of a body, comprising a primary electrical circuit including an inductive reactance and a condensive reactance, means controlled by the body for periodically impressing a direct current upon one of said reactances at a frequency which varies with the speed of the body, a metering circuit connected in shunt with an impedance in said primary circuit including, in series, a condenser and a rectifying unit, and a current meter connected to the output of said rectifying unit.

11. Apparatus for indicating the speed of a body, comprising a primary electrical circuit including an inductive and a condensive reactance, means controlled by the body for periodically impressing a direct current upon said inductive reactance at a frequency which varies with the speed of the body, a metering circuit connected in shunt with an impedance whose potential is determined by the flow of current through said primary circuit including, in series, a condenser, a resistance, and a rectifying unit, and a direct current meter of the movable coil, permanent magnet type, connected to the output terminals of said rectifying unit provided with a scale for indicating the speed of said body.

12. The apparatus according to claim 11 in which the metering circuit is connected in shunt with one of said reactances.

13. Apparatus for measuring the speed of a body, comprising a primary electrical circuit including an inductive and a condensive reactance, means controlled by the body for periodically impressing a direct current upon one of said reactances at a frequency which varies with the speed of the body, a metering circuit connected in shunt with an impedance in said primary circuit including, in series, a condenser and an alternating current meter for measuring the oscillating potential impressed upon it.

14. The apparatus according to claim 13 in which the metering circuit includes a resistance and an alternating current galvanometer.

15. Apparatus for measuring the speed of a body, comprising a primary electrical circuit including a storage battery, a condensive reactance, and an inductive reactance, means controlled by the body for periodically short-circuiting said condensive reactance at a frequency which varies with the speed of the body, and a metering circuit connected in shunt with an impedance in said primary circuit including, in series, a condenser and means for measuring the potential of an oscillating current impressed upon said impedance.

16. The apparatus according to claim 15 in which the metering circuit is connected in shunt with one of said reactances.

17. Apparatus for indicating the speed of an internal combustion engine comprising, in combination, an ignition circuit of said engine, said circuit including a source of current supply, a transformer, a current breaker connected to said engine to operate at a frequency proportional to the speed of the engine, and a condenser, and a metering circuit connected in shunt with an impedance in said ignition circuit, said metering circuit including a condenser, a resistance, and a current meter provided with a scale to indicate the speed of the engine.

18. The apparatus according to claim 17 in which the metering circuit is connected in shunt with a reactance in said ignition circuit, and the metering circuit includes, in series, a condenser, a resistance, a rectifying unit of the dry type, and a direct current meter of the movable coil, permanent magnet type, is connected to the output terminals of said rectifying unit, said meter being provided with a scale for indicating the speed of the engine.

19. The combination with an ignition circuit of an internal combustion engine, said circuit including a source of current supply, a transformer, and a current breaker, of an electric meter connected to one of the coils of said transformer, said meter having a pointer and a dial to indicate the speed of the engine, and a condenser in series with said meter.

20. The combination with an ignition circuit of an internal combustion engine, said circuit including a source of current supply, a transformer and a current breaker, of an electric meter connected to that portion of the ignition circuit which is interrupted by the breaker, said meter having a pointer and a dial to indicate the speed of the engine, and a condenser in series with said meter.

21. The combination with an ignition circuit of an internal combustion engine, said circuit including a source of current supply, a transformer, a current breaker, a condenser connected to the terminals of said breaker and a distributor, of an electric meter connected in that portion of the ignition circuit which is interrupted by the breaker, said meter having a pointer and a dial graduated to indicate the speed of the engine, and a condenser and a resistance mounted in the circuit which connects said meter to the ignition circuit.

22. The combination with an ignition circuit of an internal combustion engine, said circuit including a source of current supply, a transformer, a condenser, and a current breaker and distributor, of an electric meter of the movable coil, permanent magnet type connected in that portion of the ignition circuit which is interrupted by the breaker, said meter having a pointer actuated by the movable coil, a dial on said meter graduated to indicate revolutions per minute over which the pointer moves to indicate revolutions per minute of the engine, and a condenser and a variable resistance mounted in the circuit which connects said meter to the ignition circuit.

23. The combination with an ignition circuit of an internal combustion engine, said circuit including a source of current supply, a transformer, a condenser, and a current breaker and distributor, of an electric meter of the movable coil, permanent magnet type connected in that portion of the ignition circuit which is interrupted by the breaker, said meter having a pointer actuated by the movable coil, a dial on said meter graduated to indicate revolutions per minute over which the pointer moves to indicate revolutions per minute of the engine, a rectifier interposed between the meter and the interrupted circuit, and a condenser and a resistance mounted in said circuit which connects said rectifier to the ignition circuit.

HARRISON A. L. JONES.